(12) United States Patent
Aso

(10) Patent No.: US 10,060,822 B2
(45) Date of Patent: Aug. 28, 2018

(54) FUEL TANK SYSTEM

(71) Applicant: TOYOTA JIDOSHA KABUSHIKI KAISHA, Toyota-shi, Aichi-ken (JP)

(72) Inventor: Shuichi Aso, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 171 days.

(21) Appl. No.: 15/341,583

(22) Filed: Nov. 2, 2016

(65) Prior Publication Data

US 2017/0146426 A1    May 25, 2017

(30) Foreign Application Priority Data

Nov. 20, 2015  (JP) ................................. 2015-227997

(51) Int. Cl.
| | |
|---|---|
| B60K 15/00 | (2006.01) |
| B60K 15/03 | (2006.01) |
| B60K 15/04 | (2006.01) |
| B60K 15/05 | (2006.01) |
| G01M 3/00 | (2006.01) |
| G01M 3/02 | (2006.01) |
| G01M 3/28 | (2006.01) |
| B60K 15/035 | (2006.01) |

(52) U.S. Cl.
CPC ........... *G01M 3/2876* (2013.01); *B60K 15/03* (2013.01); *B60K 15/03504* (2013.01); *G01M 3/025* (2013.01); *B60K 2015/03296* (2013.01); *B60K 2015/0461* (2013.01)

(58) Field of Classification Search
CPC .. B60K 15/00; B60K 15/03; B60K 15/03504; B60K 15/04; B60K 15/05; B60K 2015/03296; B60K 2015/0461; G01M 3/00; G01M 3/02; G01M 3/025; G01M 3/28; G01M 3/2876
See application file for complete search history.

(56) References Cited

U.S. PATENT DOCUMENTS

| | | | | |
|---|---|---|---|---|
| 5,381,838 A | * | 1/1995 | Watanabe | B60K 15/04 141/198 |
| 6,279,626 B1 | * | 8/2001 | Schmitt | B60K 15/0409 141/285 |
| 2008/0271816 A1 | * | 11/2008 | Gerdes | B60K 15/04 141/368 |

(Continued)

FOREIGN PATENT DOCUMENTS

| | | |
|---|---|---|
| JP | 2000-282967 A | 10/2000 |
| JP | 2010-270618 A | 12/2010 |
| JP | 2011-519774 A | 7/2011 |

*Primary Examiner* — Nguyen Ha
(74) *Attorney, Agent, or Firm* — Oliff PLC

(57) ABSTRACT

An inter-flap space 36 between an outside flap 24 and an inside flap 44 of a filler pipe 16 is placed in communication with the inside of a fuel tank 14 using a communication pipe 62, and an open and close valve 64 is provided to the communication pipe 62. Further provided are a pressure reduction pump 82 that depressurizes the fuel tank 14, an internal tank pressure sensor 68 that detects an internal tank pressure of the fuel tank 14, and a controller that controls opening and closing of the open and close valve 64 and driving of the pressure reduction pump 82, and that determines an outside flap seal state of the outside flap 24 based on the internal tank pressure.

5 Claims, 16 Drawing Sheets

(56) References Cited

U.S. PATENT DOCUMENTS

| | | | |
|---|---|---|---|
| 2010/0218849 A1* | 9/2010 | Hagano | B60K 15/04 141/350 |
| 2011/0108563 A1 | 5/2011 | Gerdes | |
| 2011/0303300 A1* | 12/2011 | Menke | B60K 15/03504 137/14 |
| 2013/0193140 A1* | 8/2013 | Hagano | B60K 15/04 220/86.2 |
| 2016/0144711 A1* | 5/2016 | Criel | B60K 15/03504 137/14 |

* cited by examiner

FUEL TANK SYSTEM

CROSS-REFERENCE TO RELATED APPLICATION

This application is based upon and claims the benefit of priority of the prior Japanese Patent Application No. 2015-227997 filed on Nov. 20, 2015, the entire contents of which are incorporated herein by reference.

FIELD

The present invention relates to a fuel tank system.

BACKGROUND

Japanese Patent Application Laid-Open (JP-A) No. 2011-519774 describes a cap-free neck end for a fuel container including a double flap closure formed by an upper pivoting flap and a lower pivoting flap.

In a structure provided with only one flap in a filler pipe (filler neck) for refueling a fuel tank, for example, the seal state of the flap can be determined (whether or not the seal is abnormal) by depressurizing the fuel tank and detecting the change in the internal tank pressure over time.

However, in a structure provided with two flaps in the filler neck as described in the above publication, in cases in which the fuel tank has been depressurized, even if the seal of one flap is abnormal, if the seal of the other flap is normal then sometimes the internal tank pressure of the fuel tank lowers such that the flaps are determined to be normal overall.

Namely, in a structure provided with two flaps in a filler pipe, the seal state of the flaps cannot be determined simply by depressurizing the fuel tank and detecting the change in the internal tank pressure.

In consideration of the above, an object of the present disclosure is to determine whether the seal states of flaps are normal or abnormal in a structure including two flaps in a filler pipe.

SUMMARY

A first aspect includes: a fuel tank that stores fuel; a filler pipe having an upper portion that includes an insertion port for a refueling nozzle and a lower portion that is positioned inside the fuel tank; an outside flap that opens the filler pipe in a state in which the outside flap has swung from a closed position closing the filler pipe toward the fuel tank side; an inside flap that is provided further to the fuel tank side than the outside flap, that opens the filler pipe in a state in which the inside flap has swung from a closed position closing the filler pipe toward the fuel tank side; a communication pipe that places an inter-flap space, between the outside flap and the inside flap, of the filler pipe in communication with an inside of the fuel tank; an open and close valve that opens and closes the communication pipe; a pressure reduction pump that depressurizes the fuel tank; an internal tank pressure sensor that detects an internal tank pressure of the fuel tank; and a controller that controls opening and closing of the open and close valve and driving of the pressure reduction pump, and that determines an outside flap seal state of the outside flap based on the internal tank pressure detected by the internal tank pressure sensor.

In this fuel tank system, the inside flap and the outside flap are provided to the filler pipe. In a structure in which a cap for the filler pipe is omitted, providing two flaps to a filler pipe enables discharge of vaporized fuel from the fuel tank through the filler pipe to be more effectively suppressed than in a configuration in which only one flap is provided.

The inter-flap space is present between the outside flap and the inside flap. The inter-flap space is placed in communication with the inside of the fuel tank by the communication pipe, and the communication pipe is opened and closed using the open and close valve. The fuel tank is depressurized using the pressure reduction pump. By controlling the opening and closing of the open and close valve and driving of the pressure reduction pump, the controller can determine the seal state of the outside flap based on the change in value of the internal tank pressure detected by the internal tank pressure sensor.

Specifically, to determine the outside flap seal state, the controller, for example, opens the open and close valve and drives the pressure reduction pump, thereby depressurizing the fuel tank and the inter-flap space. When this is performed, the pressure acting on the outside (the inter-flap space side) and the pressure on the inside (the fuel tank side) of the inside flap are the same. In contrast, although the inside (the inter-flap space side) of the outside flap is depressurized, the outside (the atmospheric side) of the outside flap is not depressurized.

In cases in which the outside flap seal state is abnormal (does not seal), due to external gas flowing into the inside of the fuel tank through the inter-flap space, the internal tank pressure tends to maintain a state higher than in cases in which the outside flap seal state is normal. Thus, the controller determines that the outside flap seal state is normal when the internal tank pressure is maintained in a state lower than a preset outside flap determination threshold pressure, and determines that the outside flap seal state is abnormal when the internal tank pressure is maintained in a state higher than the preset outside flap determination threshold pressure.

In cases in which the controller has determined that the outside flap seal state is normal, the controller can then determine the inside flap seal state.

In such cases, the controller closes the open and close valve and depressurizes the fuel tank by driving the pressure reduction pump.

Although the outside (the inter-flap space side) of the inside flap is maintained at a specific pressure, the inside of the inside flap (the fuel tank side) is even further depressurized.

In cases in which the inside flap seal state is abnormal (does not seal), an internal tank pressure (a negative pressure) acts in series from the fuel tank side, through the inside flap, to the outside flap, and the outside flap opens. Due to external gas flowing into the inside of the fuel tank through the inter-flap space, the internal tank pressure tends to maintain a state higher than in cases in which the inside flap seal state is normal. Thus, the controller determines that the inside flap seal state is abnormal when the internal tank pressure is maintained in a state higher than a preset inside flap determination threshold pressure, and determines that the inside flap seal state is normal when the internal tank pressure is maintained in a lower state than the preset inside flap determination threshold pressure.

The controller can set different inside flap determination threshold pressures corresponding to whether the outside flap seal state was normal or abnormal, and can then thereby determine the inside flap seal state.

In such cases, the controller closes the open and close valve and depressurizes the fuel tank by driving the pressure reduction pump.

In cases in which the outside flap seal state is normal, the outside of the inside flap (the inter-flap space side) is maintained at a specific pressure; however, the inside of the inside flap (the fuel tank side) is even further depressurized.

Here, in cases in which inside flap seal state is abnormal (does not seal), pressure (a negative pressure) acts from the fuel tank side through the inside flap to the outside flap in series, and the outside flap opens. The internal tank pressure tends to maintain a state higher than in cases in which the inside flap seal state is normal due to external gas flowing into the inside of the fuel tank through the inter-flap space. Thus, the controller determines that the inside flap seal state is normal when the internal tank pressure is maintained in a state lower than the inside flap determination threshold pressure that has been set to when the outside flap seal state is normal, and the controller determines that the inside flap seal state is abnormal when the internal tank pressure is maintained in a higher state thereto.

In contrast, in cases in which the outside flap seal state is abnormal, the pressure of the inter-flap space becomes atmospheric pressure.

In cases in which the inside flap seal state is abnormal (does not seal), external gas flows into the inside of the fuel tank through the inside flap and the outside flap. The internal tank pressure tends to maintain a state higher than in cases in which the inside flap seal state is normal. Thus, the controller determines that the inside flap seal state is normal when the internal tank pressure is maintained in a state lower than the inside flap determination threshold pressure that has been set to when the outside flap seal state is abnormal, and the controller determines that the inside flap seal state is abnormal when the internal tank pressure is maintained in a higher state thereto.

DESCRIPTION OF EMBODIMENTS

Figure 1:
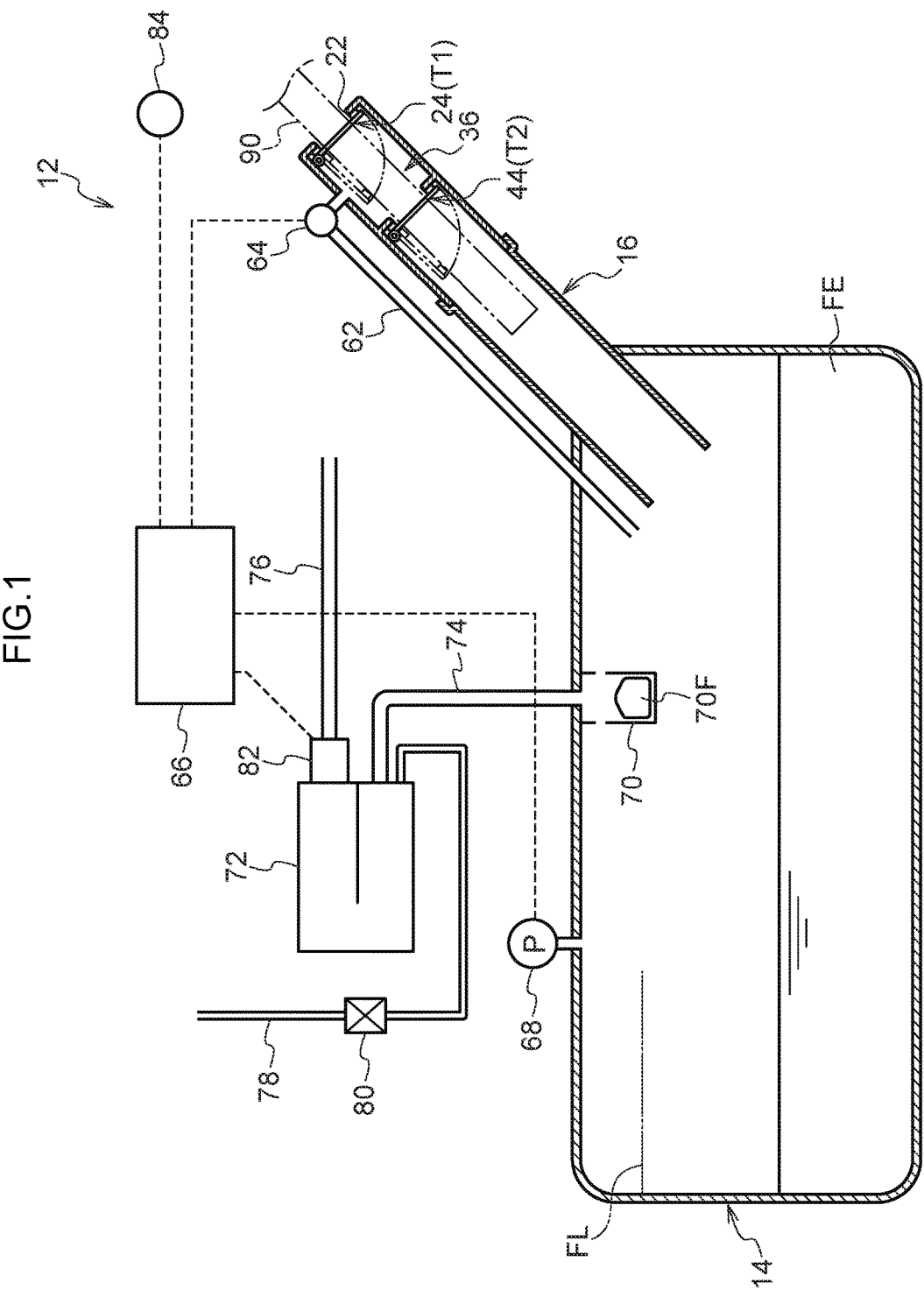
FIG. 1 is configuration diagram illustrating a fuel tank system of a first exemplary embodiment, with the fuel tank shown in cross-section.

FIG. 1 illustrates a fuel tank system 12 of a first exemplary embodiment. The fuel tank system 12 includes a fuel tank 14 that is capable of internally storing fuel FE. A filler pipe 16 is connected to an upper section of the fuel tank 14.

Figure 2:
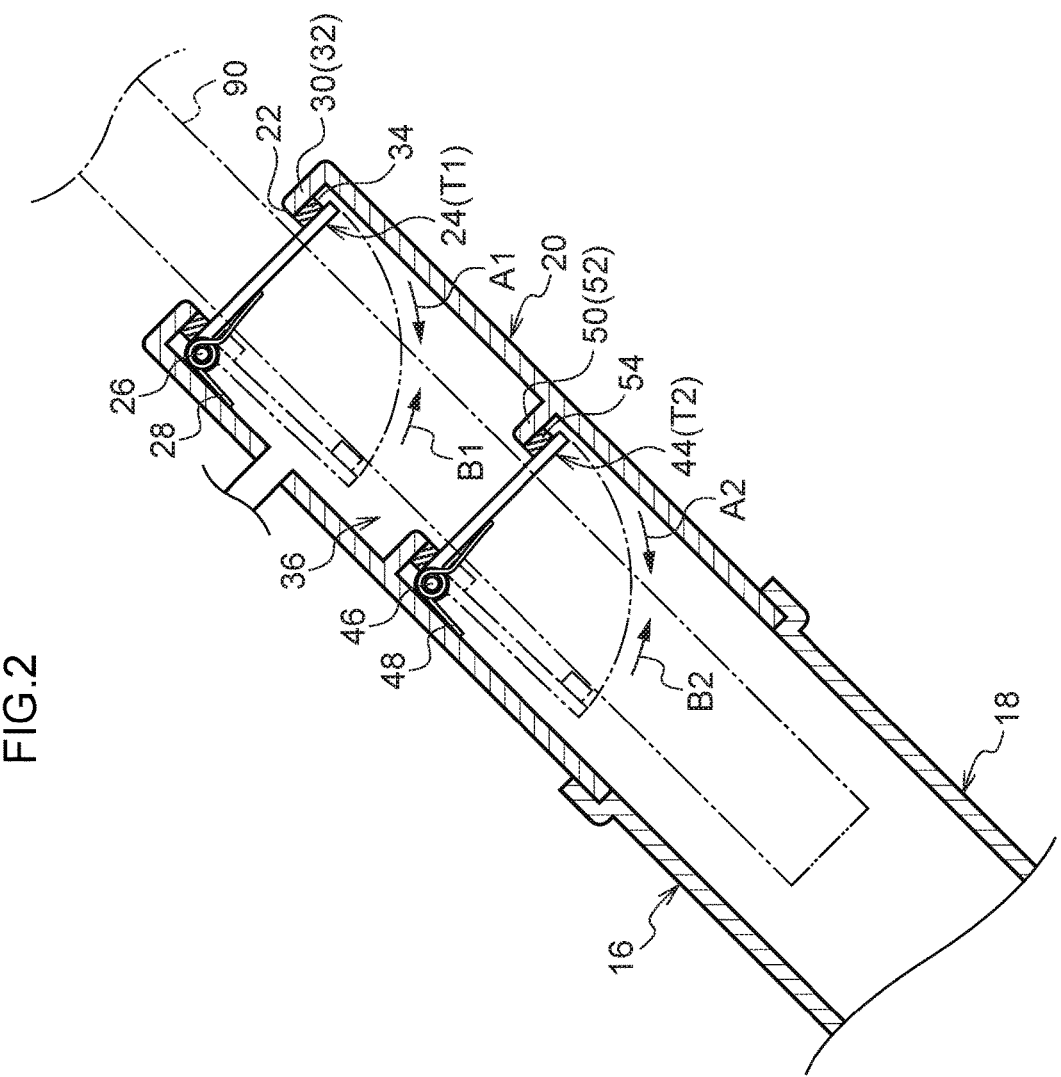
FIG. 2 is a configuration diagram illustrating a fuel tank system of the first exemplary embodiment in which an upper portion of a filler pipe is enlarged.

As illustrated in FIG. 2, in the present exemplary embodiment, the filler pipe 16 includes a tube-shaped pipe body 18 and a tube-shaped flap unit 20 that is connected to an upper portion of the pipe body 18. Namely, pipe body 18 and the flap unit 20 configure the filler pipe 16 that is tube shaped overall. The flap unit 20 is capable of detaching from and attaching to the pipe body 18.

An insertion port 22 is provided at an upper portion of the filler pipe 16 (an upper portion of the flap unit 20). A refueling nozzle is inserted into the insertion port 22. A lower portion of the filler pipe 16 (a lower portion of the pipe body 18) is disposed in the fuel tank 14, further to a lower side in the vertical direction than a full tank liquid level FL.

The filler pipe 16 (the flap unit 20) is provided with an outside flap 24 and an inside flap 44.

In the present exemplary embodiment, the outside flap 24 is provided in the vicinity of the insertion port 22 of the filler pipe 16, and the inside flap 44 is provided further to the fuel tank 14 side than the outside flap 24. Note that in the present exemplary embodiment, the filler pipe 16 is disposed obliquely so as to be disposed lower on progression from the insertion port 22 side toward the inside of the fuel tank 14, such that the outside flap 24 is also an upper side flap, and the inside flap 44 is also a lower side flap. However, sometimes the filler pipe 16 is shaped such that the locations where the outside flap 24 and the inside flap 44 are provided are substantially horizontal, and in such cases, an up-down relationship between the outside flap 24 and the inside flap 44 does not arise.

The outside flap 24 is a member with a shape capable of closing off the filler pipe 16. The outside flap 24 is attached to the filler pipe 16, so as to be capable of swinging, by a swing shaft 26 that is orthogonal to an axial direction of the filler pipe 16.

As illustrated in FIG. 2, at a closed off position T1, the outside flap 24 closes off the filler pipe 16. The outside flap 24 swings from the closed off position T1 toward the fuel tank 14 side (the arrow A1 direction) to open the filler pipe 16.

The outside flap 24 is biased by a spring 28 in the arrow B1 direction toward the closed off position T1; however, the outside flap 24 is prevented from swinging any further in the arrow B1 direction from the closed off position T1 by a stopper 30.

As illustrated by double-dotted intermittent lines in FIG. 1 and FIG. 2, when the outside flap 24 is pressed from the insertion port 22 side by a refueling nozzle 90, the outside flap 24 swings from the closed off position T1 toward the opening direction (the arrow A1 direction), against the biasing force from the spring 28.

The outside flap 24 is set with a specific opening valve pressure $P_{out}$. In the closed off position T1 state, the outside flap 24 swings (opens) in the arrow A1 direction when a pressure at an inter-flap space 36 side, described later, becomes lower, by a specific amount or greater, than a pressure at the insertion port 22 side.

As illustrated in FIG. 2, similarly to the outside flap 24, the inside flap 44 is attached to the filler pipe 16, so as to be capable of swinging, by a swing shaft 46 that is orthogonal to an axial direction of the filler pipe 16 as well.

In a closed off position T2, the inside flap 44 closes off the filler pipe 16. When the inside flap 44 swings from the closed off position T2 toward the fuel tank 14 side (in the arrow A2 direction), the inside flap 44 opens the filler pipe 16.

The inside flap 44 is biased by a spring 48 in an arrow B2 direction toward the closed off position T2; however, the inside flap 44 is prevented from swinging any further in the arrow B2 direction from the closed off position T2 by a stopper 50.

As illustrated by double-dotted intermittent lines in FIG. 1 and FIG. 2, when the inside flap 44 is pressed from the inter-flap space 36 side (the insertion port 22 side) by the refueling nozzle 90, the inside flap 44 swings from the closed off position T2 toward the opening direction (the arrow A2 direction), against the biasing force from the spring 48.

The inside flap 44 is set with a specific opening valve pressure Pin. The inside flap 44 swings (opens) in the arrow A2 direction when a pressure at the fuel tank 14 side becomes lower, by a specific amount or greater, than the pressure at the inter-flap space 36 side.

Gaskets 34, 54 are attached to the outside flap 24 and the inside flap 44. When the gaskets 34, 54 are in the respective closed off positions T1, T2, the gaskets are in close contact with valve seats 32, 52 of the filler pipe 16, thereby maintaining respective seal states.

As illustrated in FIG. 2, in the present exemplary embodiment, configuration is made in which the stoppers 30, 50 also serve as the valve seats 32, 52, respectively.

Hereafter, the seal state of the outside flap 24 by a gasket is referred to as an "outside flap seal state", and similarly, the seal state of the inside flap 44 by a gasket is referred to as an "inside flap seal state".

A state in which the gasket 34 is in close contact with the valve seats 32 and movement of gasses is not permitted is a "normal" outside flap seal state. In contrast, a state in which movement of gasses is permitted, despite the outside flap 24 being in the closed off position T1, is an "abnormal" outside flap seal state. Examples of the cause of the abnormal outside flap seal state include a gap arising between the gasket 34 and the valve seat 32, and the gasket 34 being displaced. Another example of a cause is a state in which the outside flap 24 is not in the closed off position T1 due to the spring 28 being displaced, or the spring force being reduced, or the like.

Similarly, a state in which the gasket 54 is in close contact with the valve seat 52 and movement of gasses is not permitted is a "normal" inside flap seal state. In contrast, a state in which movement of gasses is permitted, despite the inside flap 44 being in the closed off position T2, is an "abnormal" inside flap seal state. Similarly to the outside flap seal state, examples of the cause of the abnormal inside flap seal state include a gap arising between the gasket 54 and the valve seat 52, or the gasket 54 being displaced. Another example of a cause is a state in which the outside flap 44 is not in the closed off position T2 due to the spring 48 being displaced, or the spring force being reduced, or the like.

The inside flap 44 is disposed at a position sufficiently far away from the outside flap 24 so as not to impede the swing path of the outside flap 24.

In the filler pipe 16, the inter-flap space 36 is a space between the outside flap 24 in the closed off position T1, and the inside flap 44 in the similarly closed off position T2.

As illustrated in FIG. 1, the inter-flap space 36 and the inside of the fuel tank 14 are connected by a communication pipe 62. The communication pipe 62 is provided with an open and close valve 64. Opening and closing of the open and close valve 64 is controlled by a controller 66.

In an open state of the open and close valve 64, the inter-flap space 36 and the inside of the fuel tank 14 are in communication with each other, and movement of gasses is permitted. In a closed state of the open and close valve 64, the inter-flap space 36 and the inside of the fuel tank 14 are not in communication with each other, and movement of gasses is not permitted.

An internal tank pressure sensor 68 is provided to the fuel tank 14. The internal tank pressure sensor 68 detects the internal pressure of the fuel tank 14 (an internal tank pressure Pt). Data regarding the detected internal tank pressure Pt is sent to the controller 66.

A full tank regulator valve 70 is attached to the inside of the fuel tank 14. The full tank regulator valve 70 is provided with a float 70F that has a lighter specific weight than the fuel (that floats on the fuel). A canister 72 is provided external to the fuel tank 14. A vapor pipe 74 connects the full tank regulator valve 70 and the canister 72 together. In a state in which the float 70F is not floating on the fuel, the full tank regulator valve 70 is open, and gasses inside the fuel tank 14 are able move into the canister 72 through the vapor pipe 74. Vaporized fuel included in the gasses inside the fuel tank 14 is adsorbed to an adsorbent in the canister 72 due to movement of the gasses inside the fuel tank 14 into the canister 72.

In contrast thereto, during refueling, when a state has been reached in which the float 70F is floating on the fuel (has risen) and the regulator valve 70 has been closed, gasses inside the fuel tank 14 are not able to move into the canister 72. When further refueling from the refueling nozzle 90 occurs in this state, the refueling fuel remains in the filler pipe 16 and the fuel liquid level inside the filler pipe 16 rises. Refueling is stopped, by what is referred to as an automatic shutoff mechanism of the refueling nozzle 90, when the fuel inside the filler pipe 16 reaches the refueling nozzle 90.

One end of an atmospheric opening pipe 76 and one end of a purge pipe 78 are connected to the canister 72. Another end of the atmospheric opening pipe 76 is open to the atmosphere. Another end of the purge pipe 78 is connected to an engine, not illustrated in the drawings, and a purge valve 80 that opens and closes the purge pipe 78 is provided partway along the purge pipe 78. Negative pressure from the engine can be applied to the canister 72 by opening the purge valve 80 while running the engine. Air is introduced from the atmospheric opening pipe 76 and vaporized fuel that has been adsorbed by the adsorbent inside the canister 72 is desorbed (purged) due to this negative pressure.

A pressure reduction pump 82 is provided to the atmospheric opening pipe 76. Driving of the pressure reduction pump 82 is controlled by the controller 66. The canister 72 and the fuel tank 14 can be depressurized by driving the pressure reduction pump 82. In particular, in a state in which the open and close valve 64 is open, the inside of the fuel tank 14 and the inter-flap space 36 are in communication with each other, such that in addition to the fuel tank 14, the inter-flap space 36 can also be depressurized.

An indication member 84 is connected to the controller 66. As described later, when the controller 66 has determined, for example, that the outside flap seal state is abnormal, or that the inside flap seal state is abnormal, the controller 66 indicates this using the indication member 84. An example of the indication member 84 may be a member that indicates visually, such as a lamp or a display, or a member that indicates audibly, such as a buzzer or a speaker.

Next, explanation follows regarding a method for determining the outside flap seal state and the inside flap seal state in the present exemplary embodiment, and regarding operation of the present exemplary embodiment.

Figure 3:
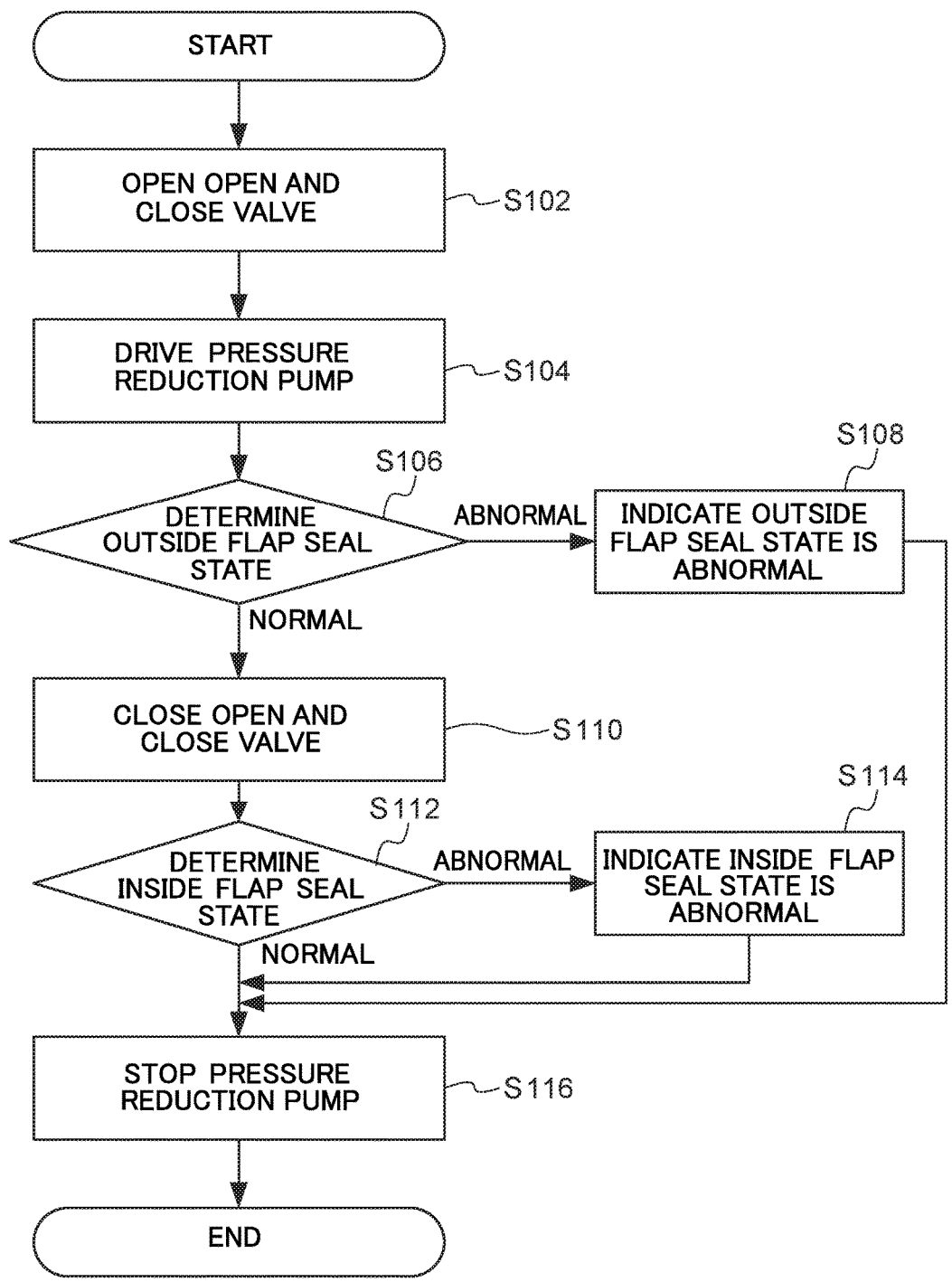
FIG. 3 is a determination flow for determining a seal state of a flap of a fuel tank system of the first exemplary embodiment.

FIG. 3 illustrates an example of a determination flow for determining the outside flap seal state, and, in cases in which the outside flap seal state is normal, to then determine the inside flap seal state.

In the determination flow, first, at step S102, the controller 66 opens the open and close valve 64. Accordingly, the inter-flap space 36 and the inside of the fuel tank 14 are communicated with each other through the communication pipe 62, and the movement of gasses is permitted.

Next, at step S104, the controller 66 drives the pressure reduction pump 82. The inside of the fuel tank 14 and the inter-flap space 36 are thereby depressurized. When this is performed, the pressure acting on the fuel tank 14 side (the lower side) and the inter-flap space 36 side (the upper side) of the inside flap 44 is the same, such that the state of the inside flap 44 does not change.

Next, at step S106, the controller 66 determines the outside flap seal state from the change in the value of the internal tank pressure Pt which is detected by the internal tank pressure sensor 68.

Figure 4:
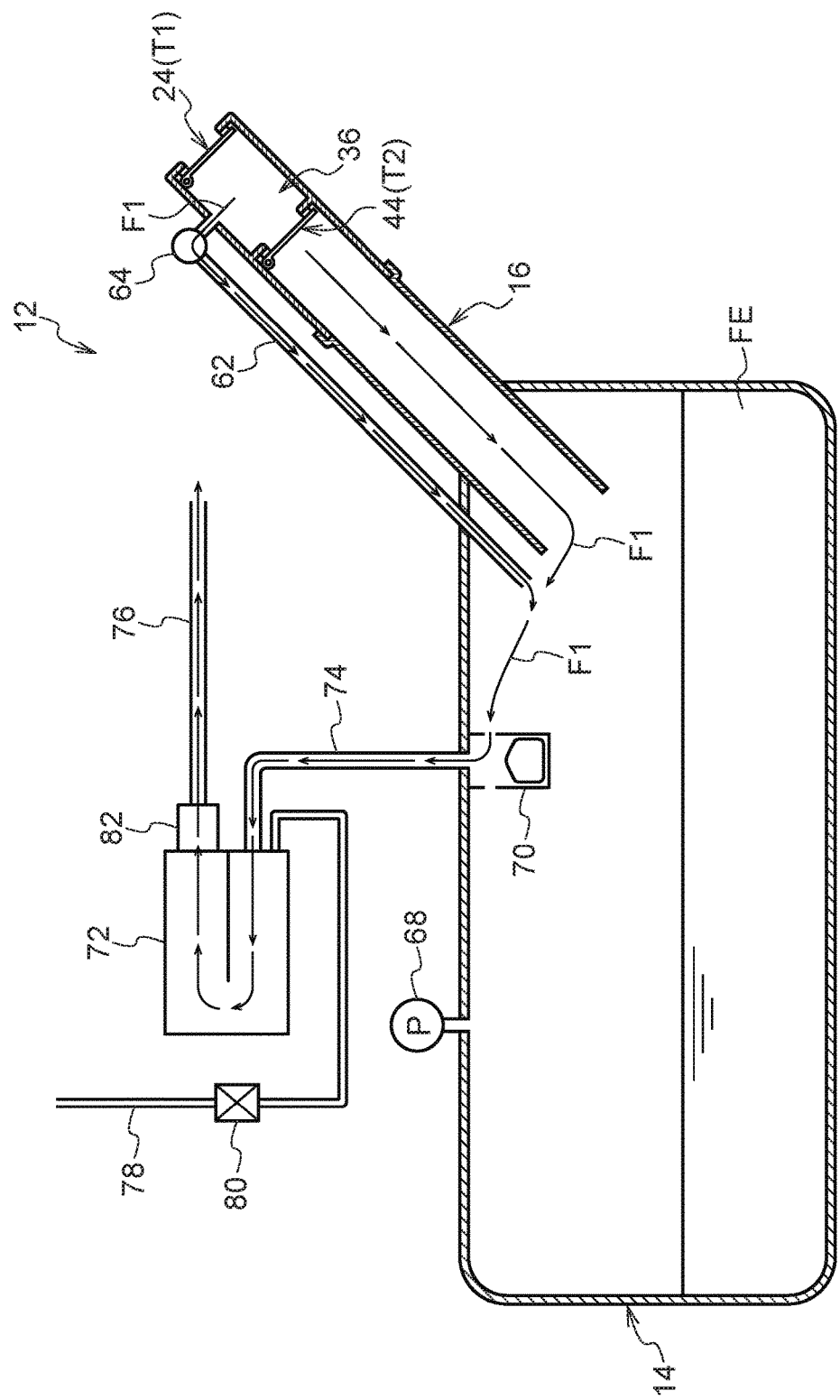
FIG. 4 is a cross-section illustrating a fuel tank system of the first exemplary embodiment in a case in which an outside flap seal state is normal.
Figure 5:
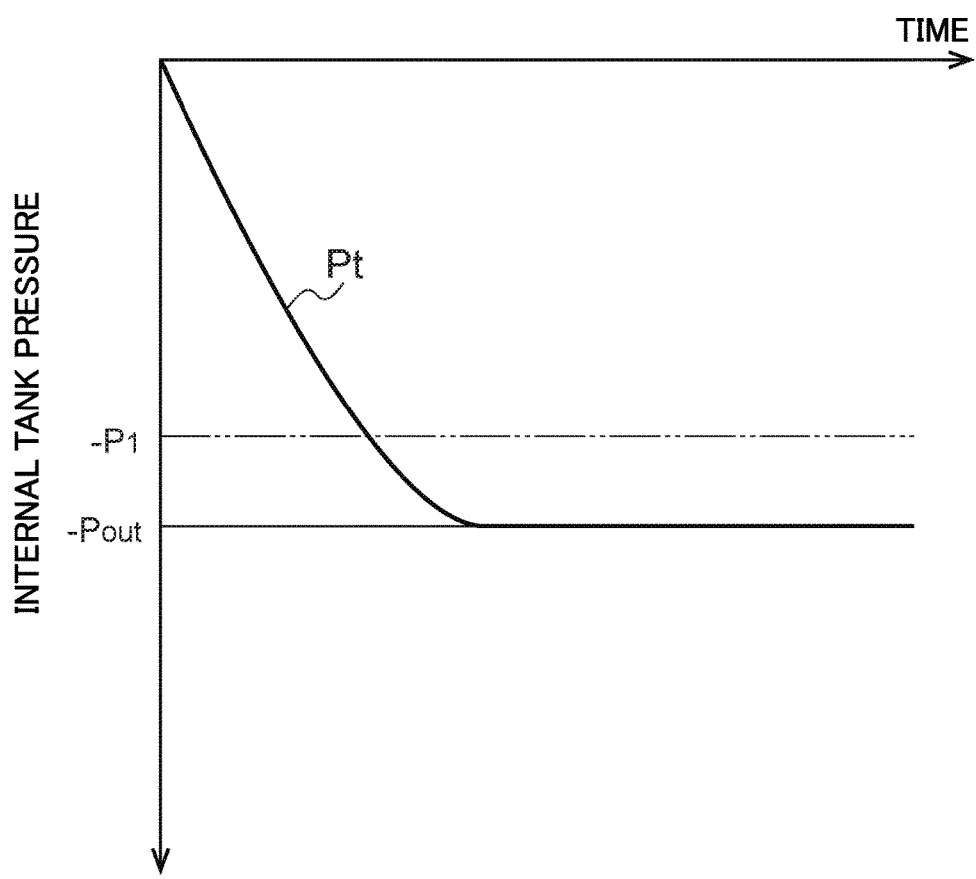
FIG. 5 is a graph qualitatively illustrating an example of an internal tank pressure of the fuel tank system of the first exemplary embodiment changing over time in a case in which the outside flap seal state is normal.

If the outside flap seal state is normal, outside air does not flow into the fuel tank 14 through the inter-flap space 36, even if the inter-flap space 36 is depressurized and the pressure is lowered, so long as the outside flap 24 is at the closed off position T1, as illustrated in FIG. 4. Gas flow occurs from the inside of the fuel tank 14, from the inside of the filler pipe 16 (a portion further to the fuel tank 14 side than the inside flap 44), and from the inter-flap space 36, toward the pressure reduction pump 82, as illustrated by the arrows F1. As illustrated in FIG. 5, the internal tank pressure Pt gradually lowers with the passage of time to a valve opening pressure Pout of the outside flap 24.

When the internal tank pressure Pt is lowered to the valve opening pressure Pout of the outside flap 24, the outside flap 24 opens. However, when the outside flap 24 is slightly open such that the pressure of the inter-flap space 36 temporarily rises, the opened outside flap 24 attempts to close. The pressure of the inter-flap space 36 is accordingly maintained near the valve opening pressure Pout of the outside flap 24.

Figure 6:
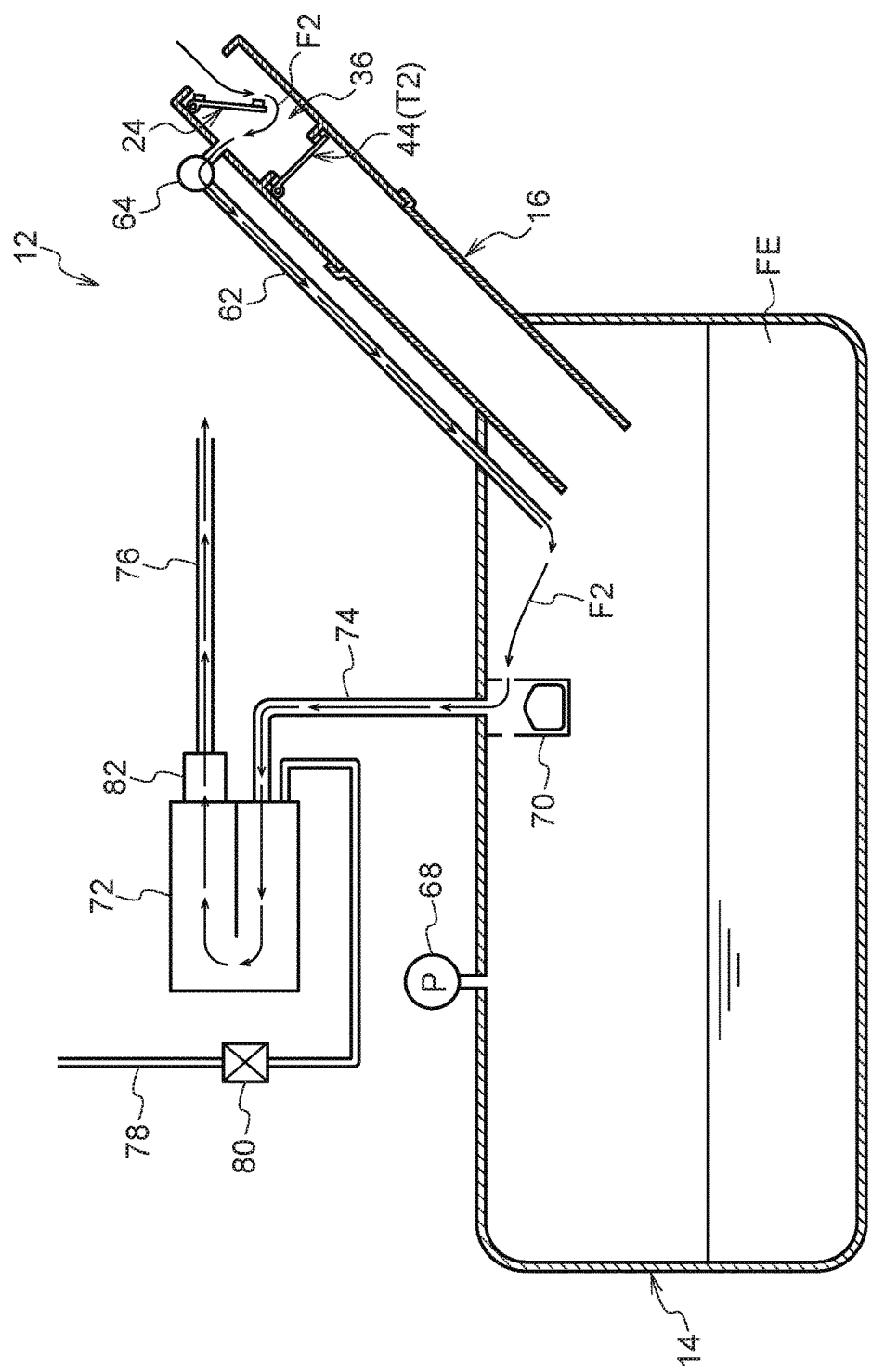
FIG. 6 is a cross-section illustrating the fuel tank system of the first exemplary embodiment in a case in which the outside flap seal state is abnormal.
Figure 7:
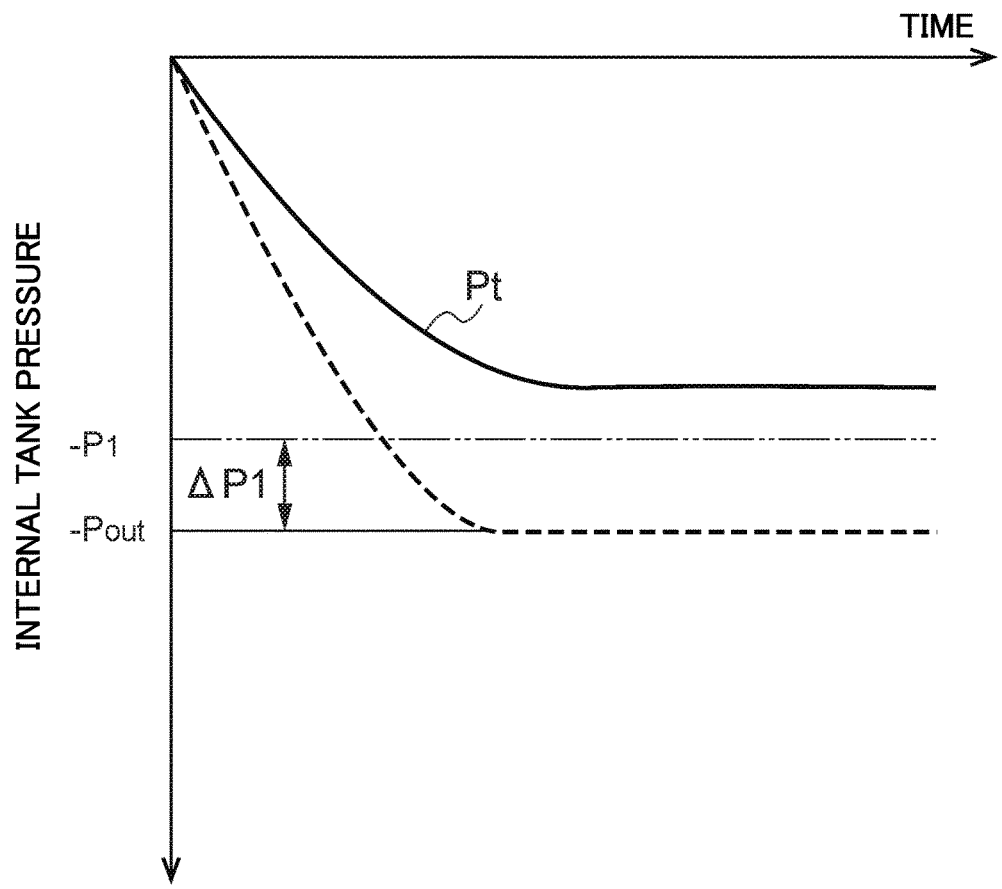
FIG. 7 is a graph qualitatively illustrating an example of the internal tank pressure of the fuel tank system of the first exemplary embodiment changing over time in a case in which the outside flap seal state is abnormal.

In contrast, as illustrated in FIG. 6, if the outside flap seal state is abnormal, outside air flows into the fuel tank 14 through the inter-flap space 36 due to the pressure drop in the inter-flap space 36, as illustrated by the arrows F2. In this manner, gas flows into the fuel tank 14 such that, as illustrated by a solid line in FIG. 7, the internal tank pressure Pt is lowered more gradually than in cases in which the outside flap seal state is normal (illustrated by a dashed line therein).

The internal tank pressure Pt is thereby in a state higher than the valve opening pressure Pout of the outside flap 24. When the internal tank pressure Pt is maintained (while a specific amount of time passes) in a state higher than an outside determination threshold pressure P1 (the outside determination threshold pressure P1 in practice is described later) of the outside flap 24, the controller 66 determines that the outside flap seal state is abnormal.

Note that, in practice, the outside determination threshold pressure P1 is used to determine the outside flap seal state. The outside determination threshold pressure P1 is a value of smaller magnitude than the valve opening pressure $_{Pout}$ of the outside flap 24 (negative values are downward in the graph in FIG. 7, and so the outside determination threshold pressure P1 appears above the valve opening pressure$_{Pout}$). A margin $\Delta P1=(Pout-P1)$ is set for determining the outside flap seal state. By providing the $\Delta P1$, even if, for example, there were to be an error in detecting the internal tank pressure Pt, the effect of this error would be reduced, enabling more accurate determination to be made. When the internal tank pressure Pt is maintained (while a specific amount of time passes) in a state lower than the outside determination threshold pressure P1, the controller 66 determines that the outside flap seal state is normal.

In cases in which the controller 66 has determined that the outside flap seal state is abnormal, processing transitions to step S108. At step S108, the controller 66 indicates that the outside flap seal state is abnormal using the indication member 84. Then the determination flow ends.

At step S106, in cases in which the controller 66 has determined that the outside flap seal state is normal, the controller 66 transitions processing to step S110. At step S110, the controller 66 closes the open and close valve 64. The inter-flap space 36 is thereby maintained in a depressurized state.

Next, the controller 66 transitions to step S112 and determines the inside flap seal state from the change in the value of the internal tank pressure Pt detected by the internal tank pressure sensor 68.

Figure 8:
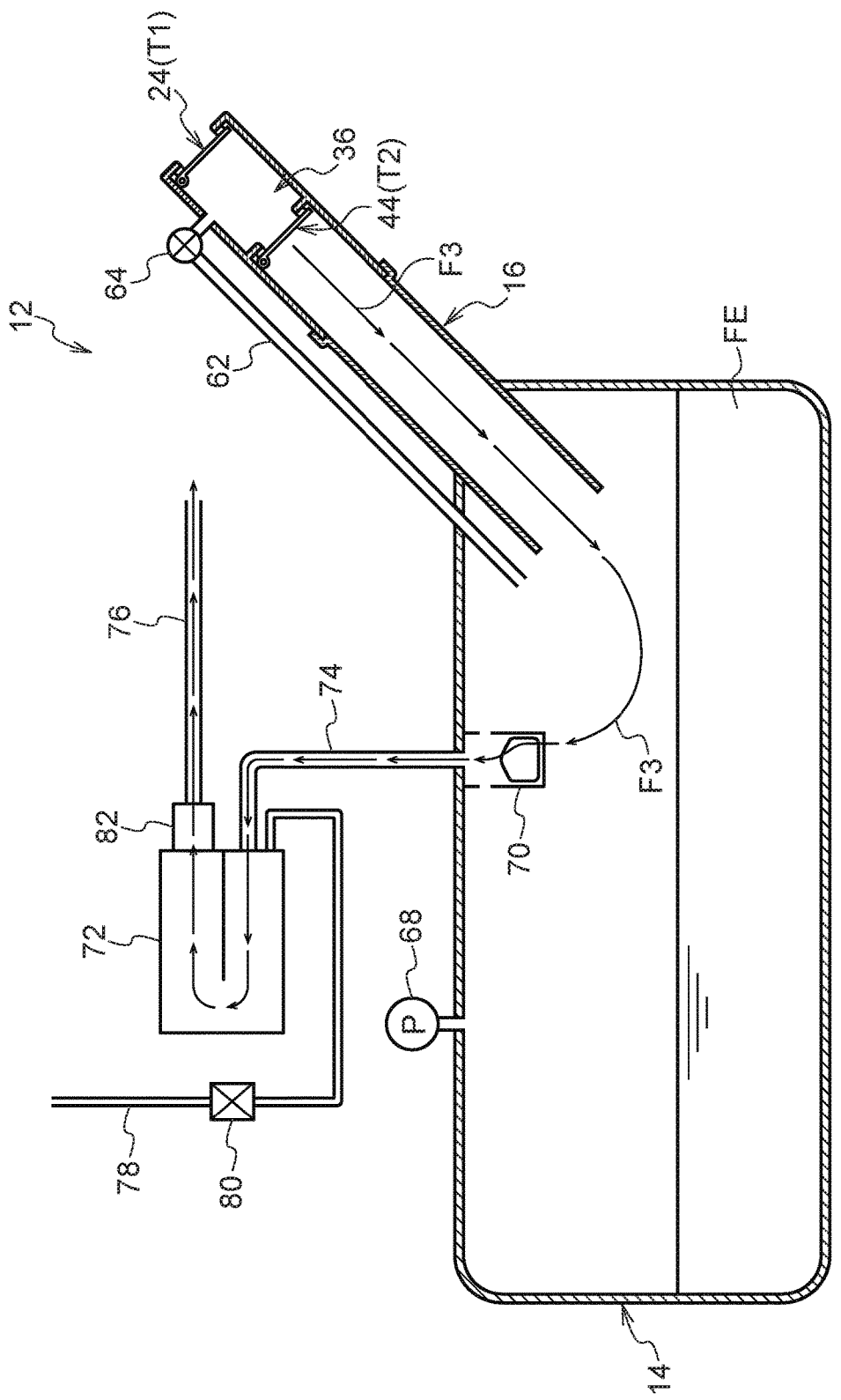
FIG. 8 is a cross-section illustrating the fuel tank system of the first exemplary embodiment in a case in which an inside flap seal state is normal.
Figure 9:
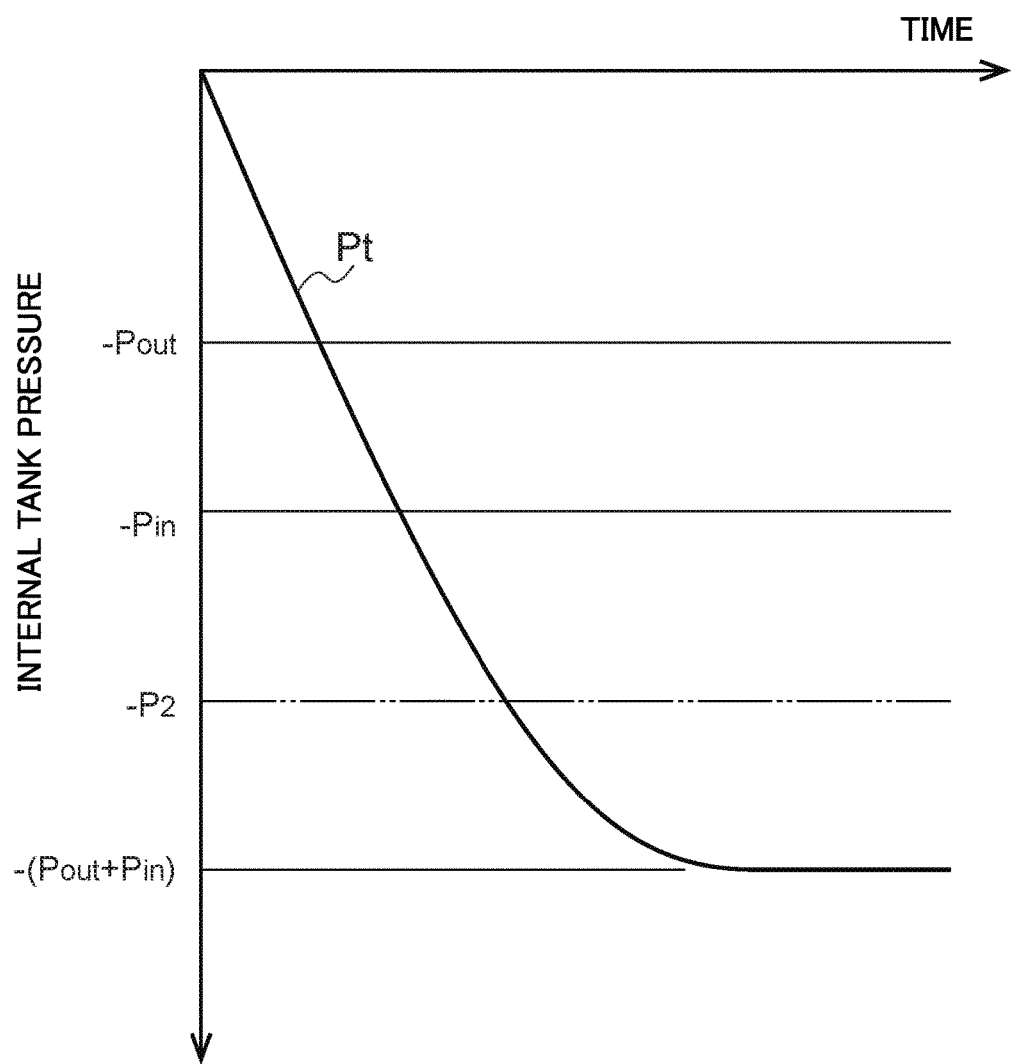
FIG. 9 is a graph qualitatively illustrating an example of the internal tank pressure of the fuel tank system of the first exemplary embodiment changing over time in a case in which the inside flap seal state is normal.

As illustrated in FIG. 8, if the inside flap seal state is normal, outside air does not flow into the fuel tank 14 in a state in which the inside flap 44 is in the closed off position T2. As illustrated by the arrows F3, gas flow occurs from the inside of the filler pipe 16 (the portion further to the fuel tank 14 side than the inside flap 44) and the inside of the fuel tank 14 toward the pressure reduction pump 82. The internal tank pressure Pt gradually lowers as illustrated in FIG. 9.

When this occurs, the pressure of the inter-flap space 36 conceivably lowers by an amount approximately close to the valve opening pressure Pout of the outside flap 24. Accordingly, when a negative pressure that is equal to, or greater than, a combined pressure Ps=(Pout+Pin), which is the sum of a valve opening pressure Pin of the inside flap 44 added to the valve opening pressure Pout of the outside flap 24, acts on the fuel tank 14 side of the inside flap 44, the inside flap 44 opens. In other words, the internal tank pressure Pt gradually lowers until reaching the combined pressure Ps.

When the internal tank pressure lowers to the combined pressure Ps, the inside flap 44 opens.

Figure 10:
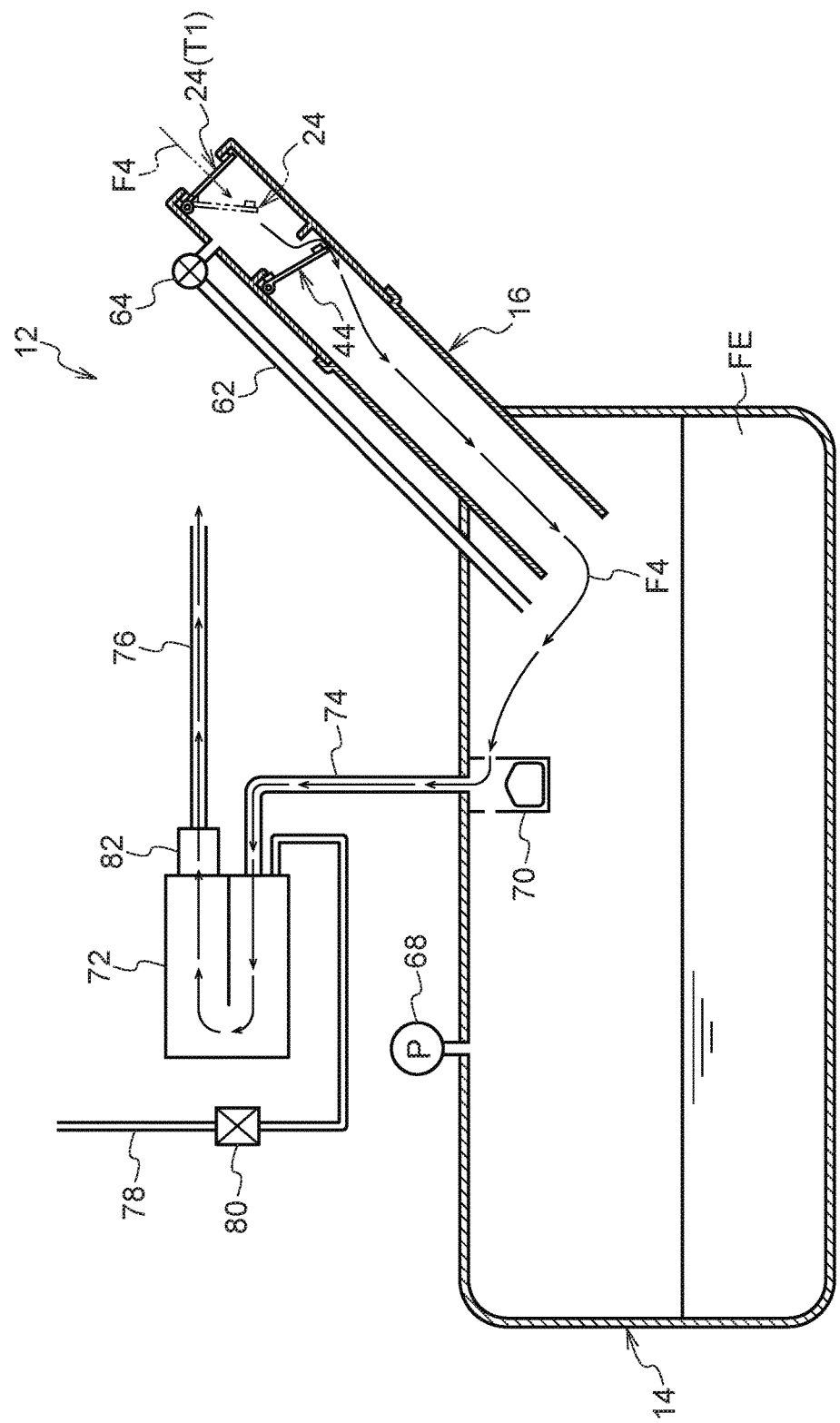
FIG. 10 is a cross-section illustrating the fuel tank system of the first exemplary embodiment in a case in which the inside flap seal state is abnormal.
Figure 11:
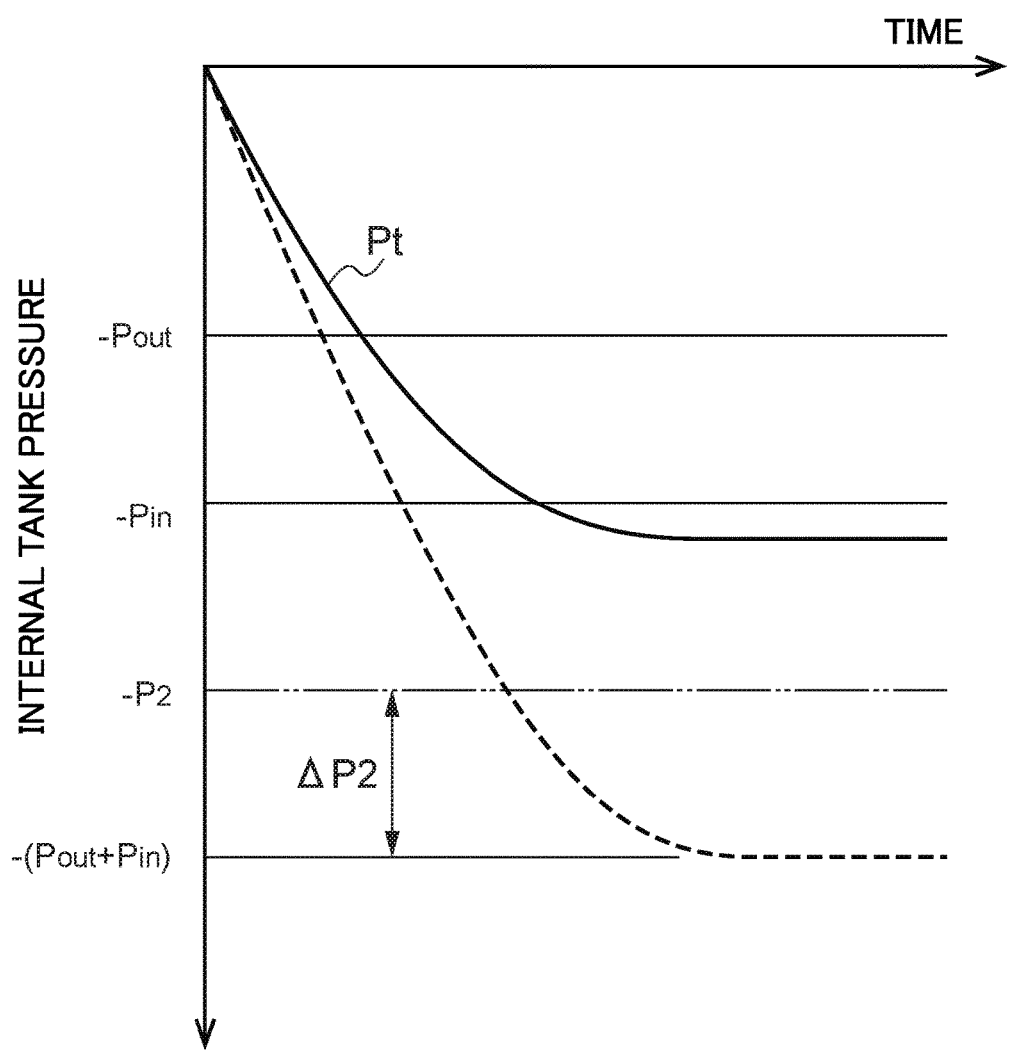
FIG. 11 is a graph qualitatively illustrating an example of the internal tank pressure of the fuel tank system of the first exemplary embodiment changing over time in a case in which the inside flap seal state is abnormal.

However, if the inside flap seal state is abnormal, the pressure in the inter-flap space 36 is further lowered by driving of the pressure reduction pump 82, and, as illustrated by the double-dotted intermittent lines in FIG. 10, the outside flap 24 opens. As illustrated by the arrows F4 in FIG. 10, gas flow occurs from the inter-flap space 36, through the filler pipe 16 and the fuel tank 14, toward the pressure reduction pump 82. As illustrated by a solid line in FIG. 11, the internal tank pressure Pt is lowered more gradually than in cases in which the inside flap seal state is normal (illustrated by the dashed line therein).

When this occurs, the internal tank pressure Pt is accordingly in a state higher than the combined pressure Ps=(Pout+Pin), this being a pressure at which the inside flap 44 opens. When the internal tank pressure Pt is maintained (while a specific amount of time passes) in a state higher than the combined pressure Ps, the controller 66 determines that the inside flap seal state is abnormal.

Note that, in practice, an inside determination threshold pressure P2 is used to determine the inside flap seal state, similar to when determining the outside flap seal state. The inside determination threshold pressure P2 is a value higher than the combined pressure Ps, and, when determining the inside flap seal state, a margin ΔP2=(Pout+Pin−P2) is provided. Namely, if the state of the internal tank pressure Pt is maintained in a state of pressure lower than the inside determination threshold pressure P2, determination is that the inside flap seal state is normal, and if the internal tank pressure Pt is maintained in a state higher than the inside determination threshold pressure P2, determination is that the inside flap seal state is abnormal. By providing the margin ΔP2 in this manner, even if, for example, there were to be an error in detecting the internal tank pressure Pt, the effect of this error would be small, enabling more accurate determination.

In cases in which the inside flap seal state is determined to be normal, the controller 66 transitions to step S116. At step S116, the controller 66 stops the pressure reduction pump 82, and ends the determination flow.

In cases in which the inside flap seal state is determined to be abnormal, the controller 66 transitions to step S114. At step S114, the controller 66 indicates that the inside flap seal state is abnormal using the indication member 84, and then, at step S116, the controller 66 stops the pressure reduction pump 82 and ends the determination flow.

In the present exemplary embodiment, in a structure including two flaps in the filler pipe 16 (the outside flap 24 and the inside flap 44), the flap seals can be determined to be normal or abnormal in this manner.

The determination flow illustrated in FIG. 3 is an example of determining the state of the inside flap seal state in cases in which the outside flap seal state is normal.

Figure 12:
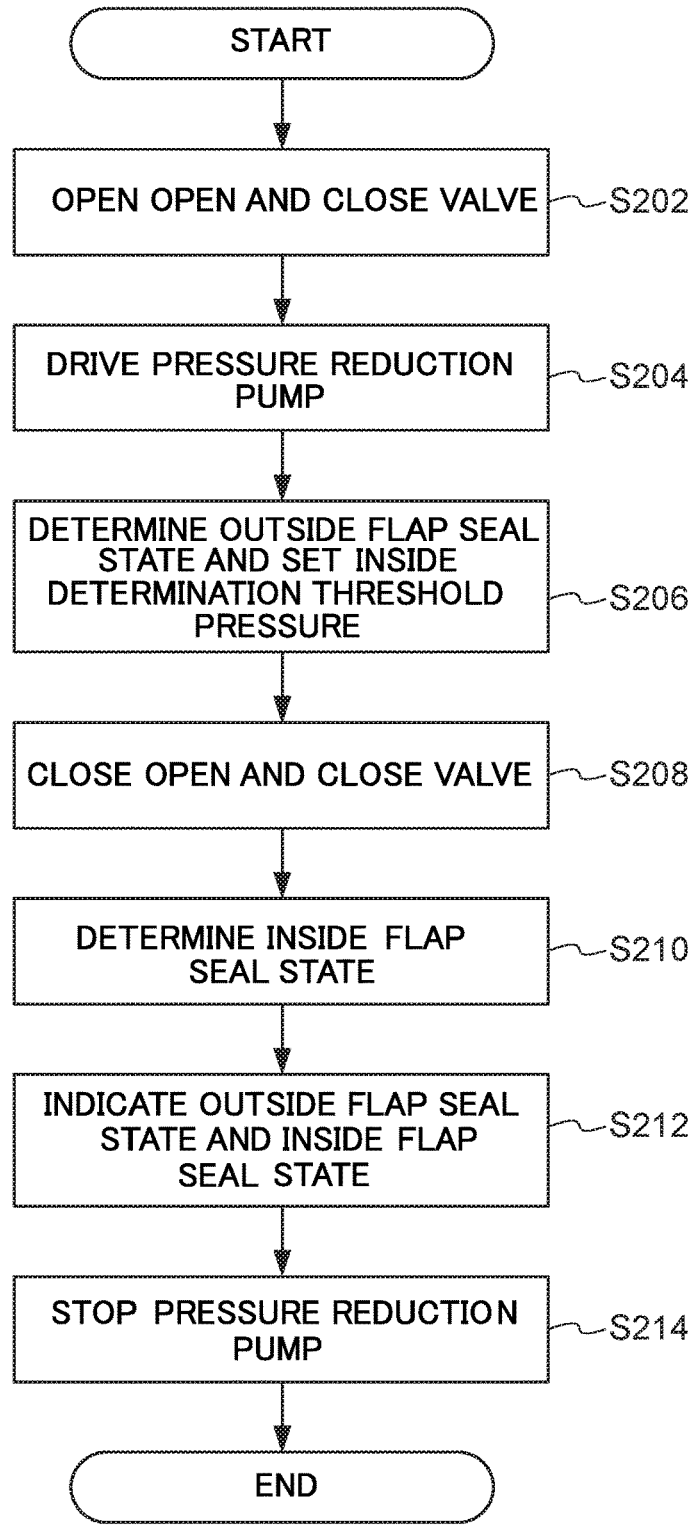
FIG. 12 is a determination flow different from that of FIG. 3, of the fuel tank system of the first exemplary embodiment for determining a seal state of a flap.

In contrast thereto, as illustrated in the determination flow in FIG. 12, it is possible to determine the inside flap seal state even in cases in which the outside flap seal state is abnormal by setting a different inside determination threshold pressure P2 or P3 according to the outside flap seal state (the normal state or the abnormal state).

In the determination flow illustrated in FIG. 12, the controller 66 opens the open and close valve 64 at step S202, and then, at step S204, the controller 66 drives the pressure reduction pump 82. The inside of the fuel tank 14 and the inter-flap space 36 are thereby depressurized.

Moreover, at step S206, the controller 66 determines the outside flap seal state from the change in value of the internal tank pressure detected by the internal tank pressure sensor 68. Namely, at step S206, when the internal tank pressure is maintained (while a specific amount of time passes) in a state higher than the outside determination threshold pressure P1 of the outside flap 24, the controller 66 determines that the outside flap seal state is abnormal. When the internal tank pressure is maintained in a state lower than the outside determination threshold pressure P1, the controller 66 determines that the outside flap seal state is normal.

At step S206, the controller 66 sets the different-valued inside determination threshold pressure P2 or P3, corresponding to whether the outside flap seal state is normal or abnormal. Then, at step S208, the controller 66 closes the open and close valve 64. Next, at step S210, the controller 66 determines the inside flap seal state. The inside determination threshold pressure P2 or the P3 set corresponding to the normal and abnormal outside flap seal state at step S206 is used in determination.

Namely, in cases in which the outside flap seal state is normal, external gas does not flow into the inter-flap space 36, and so, similarly to in the determination flow illustrated in FIG. 3, the pressure in the inter-flap space 36 becomes lower than atmospheric pressure, and should stabilize at the outside flap valve opening pressure Pout.

In such cases, if the outside flap seal state is normal, and if the inside flap seal state is normal, similarly to in the determination flow illustrated in FIG. 3, the inside flap 44 opens when a negative pressure equal to, or greater than, the combined pressure Ps=(Pout+Pin) acts on the fuel tank 14 side of the inside flap 44.

If the inside flap seal state is abnormal, when the pressure in the inter-flap space 36 lowers to the valve opening pressure Pout of the outside flap 24, the outside flap 24 opens. External gas flows through the outside flap 24 and the inside flap 44 into the fuel tank 14, such that the internal tank pressure Pt is lowered more gradually than in cases in which the inside flap seal state is normal (illustrated by the dashed line). Namely, if the internal tank pressure Pt is maintained in a state lower than the inside determination threshold pressure P2, the inside flap seal state is determined to be normal, and if the internal tank pressure Pt is maintained in a state higher than the inside determination threshold pressure P2, the inside flap seal state is determined to be abnormal.

In contrast thereto, in cases in which outside flap seal state is abnormal, external gas flows into the inter-flap space 36, and the pressure in the inter-flap space 36 becomes relatively high. In practice, the pressure of the inter-flap space 36 becomes atmospheric pressure as time passes in cases in which the outside flap seal state is abnormal.

Figure 13:
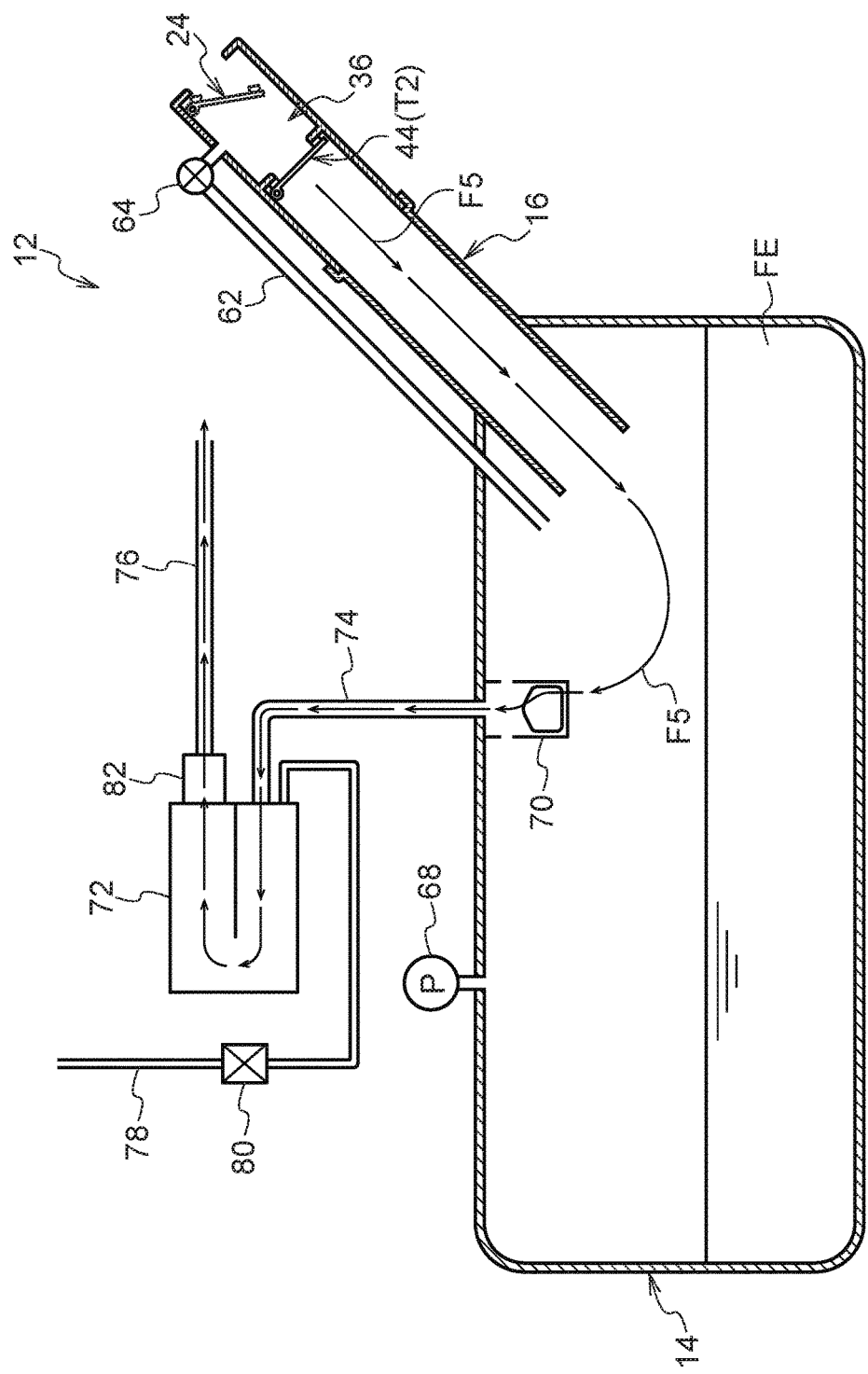
FIG. 13 is a cross-section illustrating the fuel tank system of the first exemplary embodiment in a case in which the inside flap seal state is normal.
Figure 14:
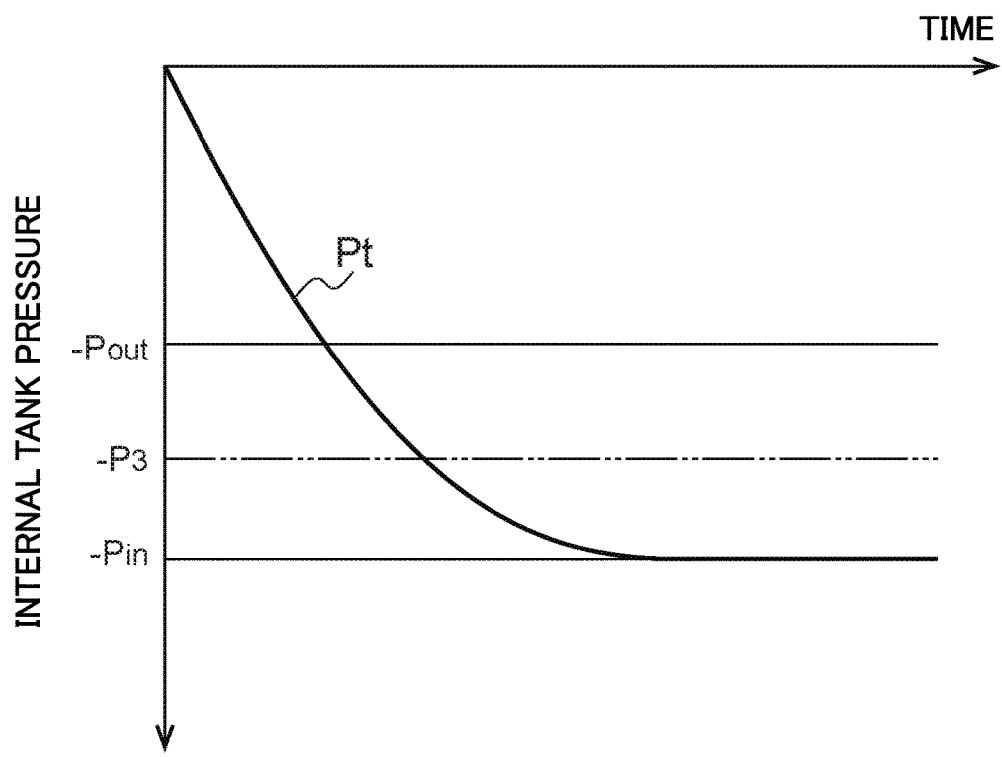
FIG. 14 is a graph qualitatively illustrating an example of the internal tank pressure of the fuel tank system of the first exemplary embodiment changing over time in a case in which the inside flap seal state is normal.

As illustrated in FIG. 13, in such cases, external gas does not flow into the fuel tank 14 as long as the inside flap seal state is normal. As illustrated by the arrows F5, gas flow occurs from the inside of the fuel tank 14 and from the inside of the filler pipe 16 (the portion further to the fuel tank 14 side than the inside flap 44) toward the pressure reduction pump 82. The internal tank pressure Pt gradually lowers as illustrated by a solid line in FIG. 14.

When the internal tank pressure lowers to the inside flap open valve pressure Pin, the inside flap 44 opens. In practice, the inside determination threshold pressure P3 which is higher than the inside flap open valve pressure Pin is used in determining the inside flap seal state. Namely, when the internal tank pressure Pt is maintained in a state lower than the inside determination threshold pressure P3, the controller 66 determines that the inside flap seal state is normal.

Figure 15:
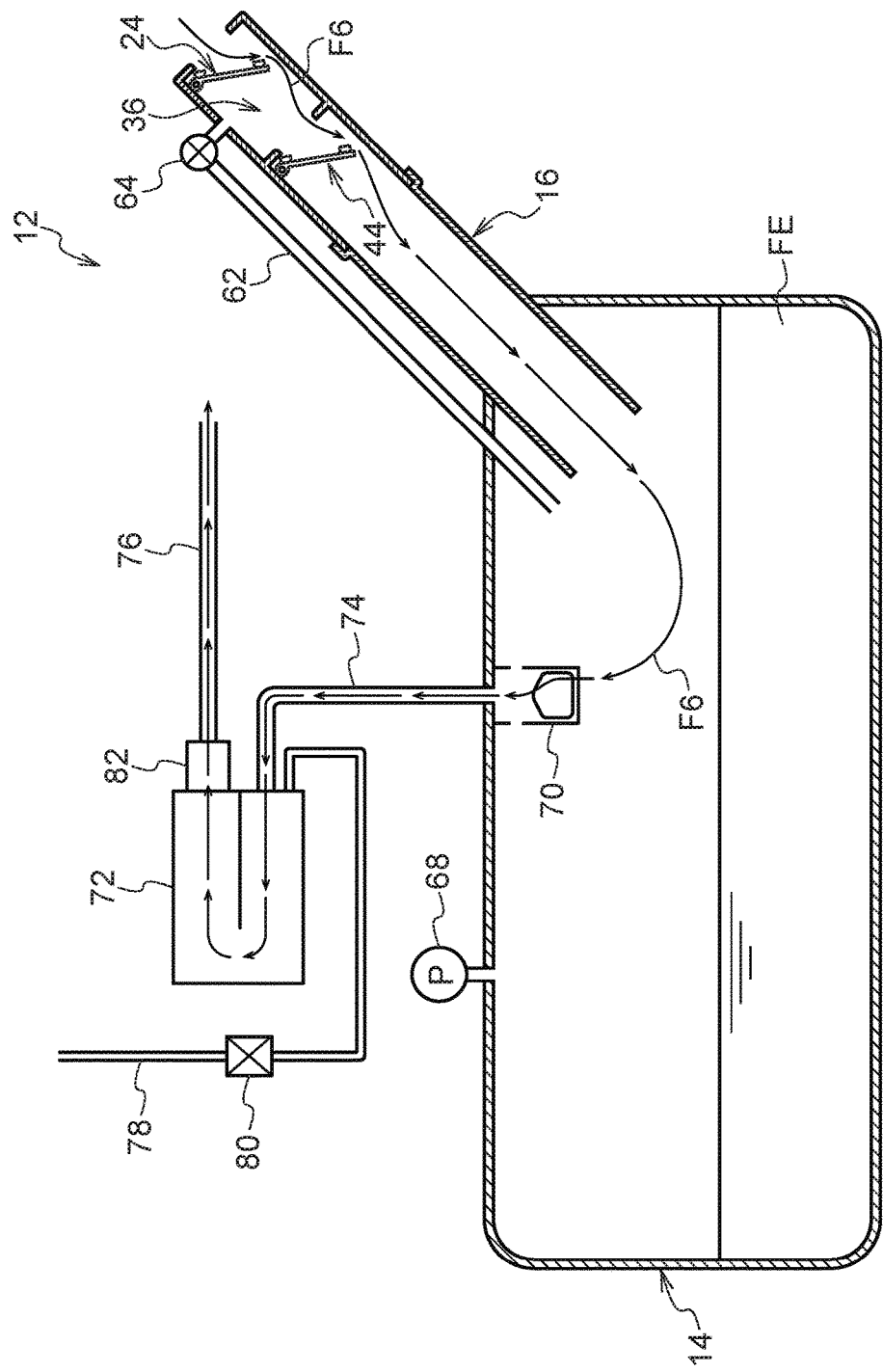
FIG. 15 is a cross-section illustrating the fuel tank system of the first exemplary embodiment in a case in which the inside flap seal state is abnormal.
Figure 16:
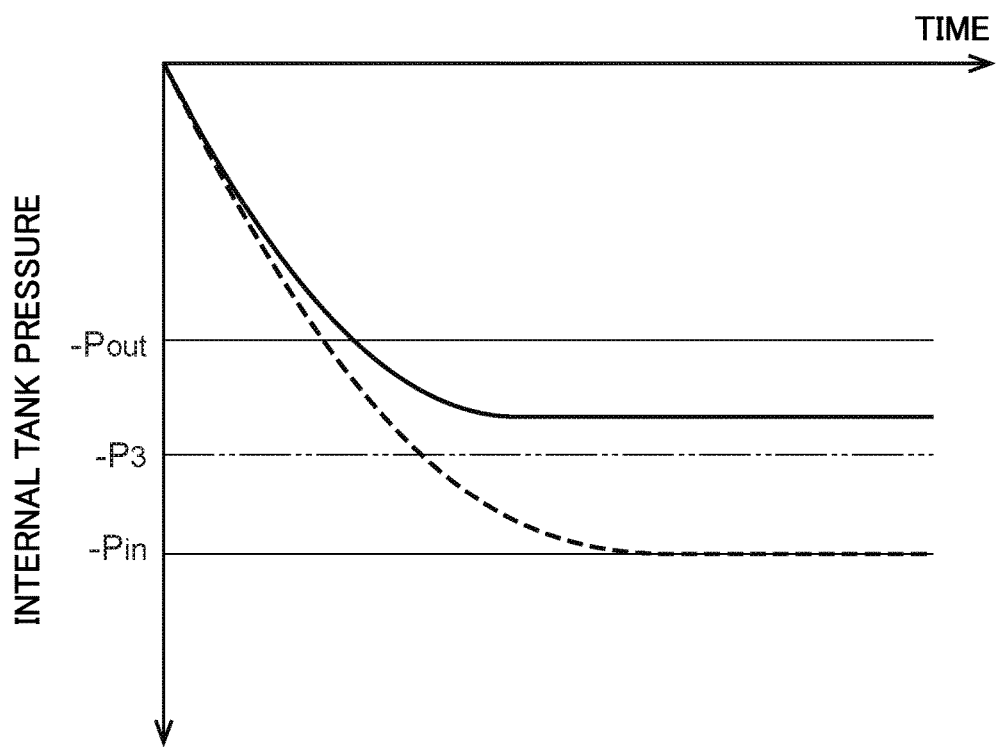
FIG. 16 is a graph qualitatively illustrating an example of the internal tank pressure of the fuel tank system of the first exemplary embodiment changing over time in a case in which the inside flap seal state is abnormal.

However, as illustrated in FIG. 15, if the inside flap seal state is abnormal, as illustrated by the arrows F6, gas flow occurs from the inter-flap space 36, through the inside of the filler pipe 16 (the portion further to the fuel tank 14 side than the inside flap 44) and the inside of the fuel tank 14, toward the pressure reduction pump 82. As illustrated by the solid line in FIG. 16, when this occurs, the internal tank pressure Pt lowers more gradually than in cases in which the inside flap seal state is normal. When the internal tank pressure Pt is maintained (while a specific amount of time passes) in a state higher than the inside determination threshold pressure P3, the controller 66 determines that the inside flap seal state is abnormal.

Next, processing transitions to step S212. In the determination flow above, determination was made as to whether the respective outside flap seal state and the inside flap seal state were normal or abnormal. The controller 66 indicates whether the respective outside flap seal state and inside flap seal state are normal or abnormal using the indication member 84.

Note that since normal/abnormal determination as is performed in this manner for both the respective outside flap seal state and the inside flap seal state, a comparison can be made as to in which flap abnormality is liable to occur by collecting statistics on these determination results.

In the present exemplary embodiment, a pump provided with the atmospheric opening pipe 76 of the canister 72 is an example of the pressure reduction pump 82. The pump can be used to detect the state of holes (to detect holes) in the fuel tank system 12, from the canister 72 to the fuel tank 14, by driving the pump to depressurize the canister 72 and the inside of the fuel tank 14. In other words, a pump for discovering holes in the fuel tank system 12 is used as the pressure reduction pump 82 of the present exemplary embodiment. There is therefore no need to provide another pressure reduction pump, and the number of components accordingly is not increased. Obviously, a separate pressure reduction pump to the pump for detecting holes may also be provided.

The technology disclosed herein enables determination of whether the seal states of flaps are normal or abnormal in a structure which includes two flaps in a filler pipe.

The disclosure in JP-A No. 2015-227997 filed on Nov. 20, 2015 is incorporated in its entirety be reference in the present specification.

All cited documents, patent applications and technical standards mentioned in the present specification are incorporated by reference in the present specification to the same extent as if the individual cited documents, patent applications, and technical standards were specifically and individually incorporated by reference in the present specification.

What is claimed is:

1. A fuel tank system comprising:
   a fuel tank that stores fuel;
   a filler pipe having an upper portion that includes an insertion port for a refueling nozzle and a lower portion that is positioned inside the fuel tank;
   an outside flap that opens the filler pipe in a state in which the outside flap has swung from a closed position closing the filler pipe toward the fuel tank side;
   an inside flap that is provided further to the fuel tank side than the outside flap, that opens the filler pipe in a state in which the inside flap has swung from a closed position closing the filler pipe toward the fuel tank side;
   a communication pipe that places an inter-flap space, between the outside flap and the inside flap, of the filler pipe in communication with an inside of the fuel tank;
   an open and close valve that opens and closes the communication pipe;
   a pressure reduction pump that depressurizes the fuel tank;
   an internal tank pressure sensor that detects an internal tank pressure of the fuel tank; and
   a controller that controls opening and closing of the open and close valve and driving of the pressure reduction pump, and that determines an outside flap seal state of the outside flap based on the internal tank pressure detected by the internal tank pressure sensor.

2. The fuel tank system of claim 1, wherein the controller
   opens the open and close valve, drives the pressure reduction pump, and depressurizes the fuel tank and the inter-flap space; and
   determines that the outside flap seal state is normal when the internal tank pressure is maintained in a state lower than a preset outside flap determination threshold pressure, and determines that the outside flap seal state is abnormal when the internal tank pressure is maintained in a state higher than the preset outside flap determination threshold pressure.

3. The fuel tank system of claim 2, wherein the controller
   depressurizes the fuel tank by driving the pressure reduction pump after the open and close valve has been closed in cases in which the outside flap seal state is determined to be normal; and
   determines that an inside flap seal state of the inside flap is normal when the internal tank pressure is maintained in a state lower than a preset inside flap determination threshold pressure, and determines that the inside flap seal state is abnormal when the internal tank pressure is maintained in a state higher than the preset inside flap determination threshold pressure.

4. The fuel tank system of claim 2, wherein the controller
   sets the inside flap determination threshold pressure differently according to whether the outside flap seal state is normal or abnormal;
   depressurizes the fuel tank by driving the pressure reduction pump after the open and close valve has been closed; and
   determines that the inside flap seal state of the inside flap is normal when the internal tank pressure is maintained in a state lower than the inside flap determination threshold pressure, and determines that the inside flap seal state is abnormal when the internal tank pressure is maintained in a state higher than the inside flap determination threshold pressure.

5. The fuel tank system of claim 1, further comprising a canister that adsorbs vaporized fuel generated inside the fuel tank, wherein the pressure reduction pump depressurizes the fuel tank via the canister.

* * * * *